Patented Jan. 23, 1934

1,944,807

UNITED STATES PATENT OFFICE 1,944,807

PROCESS FOR PRODUCING GRINDING BODIES

Theodor Pohl, Frankfort-on-the-Main, and Josef Schneider, Oberursel, Germany

No Drawing. Application September 1, 1933, Serial No. 687,910, and in Germany September 6, 1932

15 Claims. (Cl. 51—278)

This invention relates to a process for producing grinding bodies interspersed with hollow spaces of a size many times the size of the existing grinding grain, and preferably so that the total volume of the existing hollow spaces is at least 50% of the total volume of the grinding body or of the portion of the grinding body interspersed with hollow spaces.

Such grinding bodies are, according to the invention, built up of parts which may, for example, be in the form of grains, lumps, pressed string sectional pieces or of other suitable shapes and which themselves consist of a plurality of grinding grains held together by a matrix. These small parts serving for buliding up the grinding bodies are, according to the invention, fitted together so that, as compared with the grinding grain employed, comparatively large hollow spaces remain between the individual parts, so that products are obtained which have for example a cellular, honey-combed or sponge-like structure. The parts serving for building up the grinding body, consisting of a complex of grinding grains, may at the same time be relatively compact or possess a certain natural porosity or, if necessary, also an artificially increased porosity.

The usual known materials, such as corundum, silicium carbide, emery, glass or the like, may be employed as grinding material. The known ceramic matrices, such as clays, kaolin additions, and also matrices, such as shellac, artificial resins and the like are used as matrices.

In carrying out the invention a pasty mass may be produced by mixing the grinding material with the matrices, this mass being then converted into small shaped bodies, which are employed for building up the grinding bodies. This may be effected for example by producing the shaped bodies in a mold suitable for the production of the desired grinding body, if necessary with the aid of additonal matrix, and by cementing together by a suitable process, such as heating and the like, whereupon the whole body is burnt or hardened.

The shaped parts serving for building up the shaped bodies may possess sufficient solidity to be transformed into shaped bodies and to be further treated whilst the desired hollow spaces between the shaped parts are maintained. However, the shaped parts may be subjected, prior to being charged into the mold, to a more or less complete solidification or if desired to a complete hardening for example by measures, such as drying, burning and the like before being charged into the mold.

The kind and quantity of the matrix to be added to the grinding material for the purpose of producing the shaped parts may be so chosen that it is sufficient for cementing together the shaped parts charged into the molds. In this instance the intermediate treatments serving for solidifying the shaped parts must evidently be so chosen, that the shaped parts charged into the mold contain sufficient quantities of matrices capable of reaction. However, additional matrices may also be added to the shaped parts before, during or after charging into the molds. The shaped parts may be sprinkled or sprayed, or powdered for example with solid matrices, liquid, dissolved or suspended matrices may be added before, during or after the charging. For example, the contents of the mold may be subjected to a certain solidification ensuring the cohesion of the body, whereupon matrices are introduced into the hollow spaces of the shaped bodies in quantities, which are not sufficient to completly fill the hollow spaces in the finished grinding body, the latter being then subjected to a solidification or hardening. The introduction of the matrix may be effected for example by steeping the body interspersed with hollow spaces in suitable solutions or emulsions of the matrix, removing any excesses of matrix for example by dropping, centrifuging or the like, and then carrying out the solidification or hardening by known methods, for example by heating or burning. For carrying out the process matrices of similar kind, mixtures of different matrices and finally different matrices successively may be employed, for example in such a manner that for the production of the shaped parts serving for building up the grinding wheels certain matrices are employed and different kinds of matrix are employed for building up the grinding wheel. For example shaped parts may be produced from grinding material and clay, which, after sufficient solidification, are mixed with kaolin addition, whereupon the mixture is charged into the mold and burned. It is also possible to fill into the mold the shaped parts produced from grinding material and clay, to add emulsions or solutions of artificial resin and then to heat or harden.

For the purpose of producing shaped parts having an increased porosity, known means, such as gas swelling may be used. Moreover, media producing or enlarging hollow spaces may be added to the additional matrix or to the mixture of shaped parts and additional matrix, for example substances capable of forming gas bubbles, or measures of both kinds may be employed. Under certain circumstances the matrix may be also added in inflated condition, for example as foam, which is produced by beating, stirring, development of gas or similar means. As gas producing substance substances containing active oxygen come particularly into question, for example superoxide of hydrogen. In this instance the gas development can be influenced and regulated by addition of auxiliary substances, such as decomposing catalysts, soap solutions and the like.

For producing the shaped parts serving for building up the grinding bodies usual methods may be employed. Instead of using granular, spherical or similar structure, parts of different shapes, for example cylindrical, worm-shaped structures and the like may be used, which can be easily obtained by pressing pasty mixtures through sieve plates and the like.

Another form of construction according to the invention consists in producing suitable mixtures of grinding grain, matrix and if necessary substances initiating the paste formation, subjecting the mixtures or masses thus obtained after conversion into layer-shaped parts to a more or less complete solidification or hardening, and in then converting them by disintegrating processes into small structures suitable for building up the grinding bodies, each of said structures representing a conglomeration of a plurality of grinding grains united by matrix.

For example the disintegrated, more or less granular material is subdivided by sifting into portions of practically uniform grain size, the portions suitable for building up the desired grinding bodies according to the methods above described being then further treated. The subsequent working may, for example, be carried out by shaping the granular material in a suitable manner with the aid of constant or volatile matrices and then subjecting it, if necessary with the aid of additional matrices, to a treatment for cementing the grains and for solidifying or hardening the body, for example by heating.

Also in this form of carrying out the process either the whole quantity of the swelling matrix may be employed from the outset or only a portion of the matrix may be added to the grinding grain and the remainder during the further treatment of the disintegrated material. The production of the, for example, granular material intended for building up the grinding body may be effected according to different methods, which depend upon the kind of matrix selected, the quantitative proportion, the auxiliary substances added, and so forth. The mixture of the grinding material, matrix and, if necessary, substance initiating the formation of paste can generally be converted into a caked mass suitable for the disintegrating process, by merely heating or burning. In many instances masses suitable for the disintegrating process can already be obtained by merely drying the initial mixtures. The solidification of the mixture can be effected or assisted by additions of auxiliary substances, such as resins and the like.

The solidification or hardening of the mass to be disintegrated may be carried out more or less completely. Thus, one may be satisfied, for example, with a solidification which is just sufficient to allow the disintegrating proceeding to be carried out, and to make the produced grains sufficiently cohesive for the further treatment. The solidification and hardening of the initial mass may, however, be carried so far that the grains produced possess already a very great resistance and hardness, so that during the further treatment thereof to form shaped bodies, it is practically only necessary to cement the hard grains, solidifying and hardening the matrix employed for this purpose. Moreover, the measures and auxiliary measures above set forth may be employed in this method according to the invention, for example the increasing of the porosity of the mass to be disintegrated, for example by adding swelling substances to the initial mixture, the increasing of the hollow space volume during the further treatment of the granular material, for example by adding substances forming gas bubbles, the employment of frothy matrices and the like. The practical carrying out of the invention will be hereinafter described by way of a general example:—

255 grs. of artificial corundum, grain No. 80 and 45 grs. of clay matrix are stirred with water to a pasty consistency, dried and heated to 1250° C. for half an hour. After cooling the mass is disintegrated and a fraction between Din 5 and Din 10 is sifted from the disintegrated material. These grains, which contrary to an ordinary grinding grain, consisting for example of corundum, are built up from a conglomeration of small separate grinding grains, are now transformed with additions of a small additional quantity of a ceramic matrix, into shaped bodies without the application of pressure, 80 grs. of the sifted grain and 20 grs. of clay matrix being stirred with water to a plastic consistency and charged into molds in known manner, whereupon, after drying, they are transformed into the grinding body by the usual thorough burning at about 1250° C. Thus, a grinding wheel is obtained having a cellular structure and a very low spatial weight, which is composed of uniformly large separate particles of the grinding material and practically uniformly large grain parts composed of separate particles and interspersed by practically uniformly large cells in such a manner that the volume of the hollow spaces of the whole body is more than 50% of the total volume of the body.

In a similar manner 225 grs. of corundum grain No. 80, and 75 grs. clay matrix are stirred with water to a mass of pasty consistency and dried. This mass can easily be transformed into a granular material by disintegrating and grinding. The sifted fraction between Din 5 and Din 10 of the disintegrated material obtained is employed for the further treatment. The grain obtained is heated for a short time to 800 to 900° C. After cooling 90 grs. of the product and an alcoholic solution of artificial resin are stirred with 10 grs. of artificial resin to form a plastic mass. When this mass has been shaped into bodies of the desired shape and subsequently dried, the bodies are burned at a suitable temperature. The grinding wheel behaves in other respects like that produced according to the preceding example.

As only temperatures of 900 to 1000° C. are employed during the production of the mass supplying the grains, the individual grinding bodies still contain matrix masses capable of reaction. Consequently, very small quantities of additional matrices are sufficient, which practically do not unfavorably influence the size of the hollow spaces interspersing the grinding bodies, and nevertheless an extraordinarily solid binding is obtained.

The invention enables to produce grinding bodies of uniform cellular structure in a simple and reliable manner. By selection, shape and size of the structure serving for building up the grinding body it is possible to vary within wide limits the size of the hollow spaces interspersing the grinding body. Owing to the possibility of employing different matrices, special effects may be obtained. Thus, for example, for producing the structures serving for building up the grinding body, strongly liquid clay may be employed and as additional matrix for the further treatment an easily liquid ceramic mass sintering at a low temperature; this has been found very favorable for many grinding purposes. The grinding bodies produced according to the invention are remarkable for their high efficiency, light weight and extraordinary resistance against mechanical stresses occurring during the grinding operation.

3. 800 grs. of artificial corundum having a grain size of 80 to 120 are thoroughly mixed in dry condition with 200 grs. of a ceramic matrix, the melting point of which lies between 1250 and 1300° C. Water is added to this mixture as paste producing medium in such quantity that a mass capable of being cast is produced by thorough stirring. The mass is now cast to form a body of any desired size and after drying it is burned at a temperature of about 900° C. The burnt mass is then disintegrated and the shaped parts in the grain group between 8 and 12 are sifted from the disintegrated mass. For building up the grinding body 90 parts by weight of shaped parts with a size of grain between 8 and 12 are mixed with 10 parts by weight of a ceramic matrix to form a plastic mass employing as above a paste producing medium, such as water. This mass is shaped to a raw grinding body employing slight pressure. The grinding body thus produced is then burnt, after drying, at a temperature of about 1300° C. As during the burning process both the matrix mass employed for building up the shaped parts and also the matrix added during the shaping of the grinding body exert a binding effect, a grinding body is produced which, besides having a cellular structure and great porosity, also possesses the hardness and resistance necessary for grinding.

4. Shaped parts are produced from 700 grs. artificial corundum with a grain size of 80 to 120 with 300 grs. of a ceramic matrix having a melting point lying between 1250 and 1300° C., as in Example 1. For building up the grinding body 90 parts by weight of shaped parts having a grain size of 8 to 12 are thoroughly mixed with 10 parts by weight of a liquid artificial resin to form a moldable mass. This mixture is shaped to form a grinding body with the aid of suitable molds. When the raw grinding body has dried, it is burnt with a gradually increasing temperature at a temperature of about 1300° C. During this burning the artificial resin employed as temporary matrix evaporates entirely. Only the matrix mass capable of reaction present in the shaped parts acts as matrix, the quantity of the matrix mass being sufficient to sufficiently cement together the individual shaped parts. This procedure results in a particularly high porous grinding body of cellular structure, as no other substances filling the pores are inserted between the hollow spaces which are produced by natural heaping.

5. 900 parts by weight of artificial corundum of the grain size 80 to 120 are thoroughly mixed with 100 parts by weight of liquid artificial resin in a kneading mixer, and the mixture, after being removed from the mixing machine, is forced through a sieve in order to break up any lumps. The pasty mass is then placed in a mold and, after careful distribution, is rolled in the mold and lightly pressed. These bodies, after drying, are hardened at a temperature of about 120 to 150° C. The hardened body is then disintegrated and the shaped parts in a grain size of 8 to 12 are sifted out from the disintegrated grain mixture. For building up the grinding body 94 parts by weight of shaped parts are thoroughly mixed with 6 parts by weight of liquid artificial resin in a mixing machine, and the mixture, immediately after removal from the mixing machine, is shaped after having previously passed through a coarse sieve, and the body is eventually lightly pressed in the mold. The dried raw grinding body is then completely hardened at a maximum temperature of 175° C. A grinding wheel is thus obtained having a cellular structure, of great porosity and resistance and of a hardness suitable for grinding purposes.

We claim:—

1. A process for producing grinding bodies, consisting in producing from grinding material and matrices suitable shaped parts in the shape of grains, lumps, pressed string pieces and the like, and in uniting a plurality of said shaped parts to produce a grinding body in such a manner that hollow spaces remain between the shaped parts and impart a cellular structure to the grinding body.

2. A process as specified in claim 1, consisting in producing from grinding material and matrices small shaped parts containing each a plurality of grinding grains, and in uniting a plurality of said shaped parts to form a grinding body and so that this grinding body is interspersed with numerous hollow spaces.

3. A process as specified in claim 1, consisting in solidifying the shaped parts composed of grinding material and matrices and comprising a plurality of grinding grains, and in building up the grinding body from these solidified shaped parts.

4. A process for producing grinding bodies, consisting in producing from grinding material and matrices solid products, in disintegrating these products to obtain smaller shaped parts containing each a plurality of grinding grains, and in building up a grinding body from these shaped parts.

5. A process as specified in claim 1, in which grinding material having a practically uniform size of grain is employed for producing the grinding bodies.

6. A process as specified in claim 1, in which the shaped parts serving for building up grinding bodies and containing each a plurality of grinding grains are of practically uniform size.

7. A process as specified in claim 1, consisting in artificially increasing the porosity of the shaped parts serving for building up the grinding bodies.

8. A process as specified in claim 1, in which the matrices serving for uniting the shaped parts comprising each a plurality of grinding grains used for building up a grinding body still possess binding force.

9. A process for producing grinding bodies, consisting in producing from grinding material and matrices small structures containing each a plurality of grinding grains, in producing shaped parts from these structures, in building up a grinding body from said shaped parts, and in treating said grinding body to interconnect said structures and harden said grinding body.

10. A process for producing grinding bodies, consisting in producing from grinding material and matrices small structures each comprising a plurality of grinding grains and still containing effective matrices, in shaping said structures, and in transforming said shaped structures into a cellular grinding body by heating.

11. A process for producing grinding bodies, consisting in producing from grinding material and matrices small structures comprising each a plurality of grinding grains, in shaping said structures, adding additional matrices, and in heating said shaped structures to transform them into a cellular grinding body.

12. A process for producing grinding bodies, consisting in producing from grinding material and matrices small structures containing each a plurality of grinding grains, in shaping these structures, in adding an additional matrix different from the matrix first employed, and in transforming said shaped structures into a cellular grinding body.

13. A process for producing grinding bodies, consisting in producing from grinding material and matrices small structures containing each a plurality of grinding grains, in shaping said structures, and in solidifying said shaped structures in the presence of additional matrices and at the same time increasing their porosity.

14. A cellular grinding body, composed of structures in the shape of grains, each structure containing a plurality of grinding grains, said structures interspersed with hollow spaces, such as produced by heaping said structures.

15. A cellular grinding body composed of structures each containing a plurality of grinding grains, interspersed with hollow spaces of many times the size of the grinding grain, the total volume of the hollow spaces being at least 50% of the total volume of the grinding body interspersed with hollow spaces.

THEODOR POHL.
JOSEF SCHNEIDER.